US012128863B2

(12) United States Patent
Bains (10) Patent No.: US 12,128,863 B2
(45) Date of Patent: Oct. 29, 2024

(54) DETECTION OF BRAKE FAILURE USING WHEEL SPEED DURING LANDING GEAR RETRACTION

(71) Applicant: GOODRICH CORPORATION, Charlotte, NC (US)

(72) Inventor: Resham Bains, Tipp City, OH (US)

(73) Assignee: GOODRICH CORPORATION, Charlotte, NC (US)

( * ) Notice: Subject to any disclaimer, the term of this patent is extended or adjusted under 35 U.S.C. 154(b) by 716 days.

(21) Appl. No.: 17/212,913

(22) Filed: Mar. 25, 2021

(65) Prior Publication Data

US 2021/0347350 A1 Nov. 11, 2021

Related U.S. Application Data

(60) Provisional application No. 63/022,788, filed on May 11, 2020.

(51) Int. Cl.
*B60T 17/22* (2006.01)
*B64C 25/44* (2006.01)
*B64F 5/60* (2017.01)

(52) U.S. Cl.
CPC ............ *B60T 17/221* (2013.01); *B64C 25/44* (2013.01); *B64F 5/60* (2017.01); *B60T 2240/00* (2013.01); *B60T 2240/06* (2013.01)

(58) Field of Classification Search
CPC ............... B60T 17/221; B60T 2240/00; B60T 2240/06; B60T 2270/406; B60T 8/1703; B64C 25/44; B64F 5/60
See application file for complete search history.

(56) References Cited

U.S. PATENT DOCUMENTS

| 6,704,634 B1* | 3/2004 | Gowan | B64C 25/426 244/50 |
| 7,963,620 B2* | 6/2011 | DeVlieg | B60T 17/221 303/174 |
| 8,102,280 B2 | 1/2012 | Cahill | |
| 8,332,114 B2* | 12/2012 | Whittingham | B60T 8/1703 701/119 |
| 8,567,874 B2 | 10/2013 | DeVlieg et al. | |

(Continued)

FOREIGN PATENT DOCUMENTS

| EP | 2684752 | 1/2014 |
| EP | 3363697 | 8/2018 |

OTHER PUBLICATIONS

European Patent Office, European Search Report dated Sep. 22, 2021 in Application No. 21173387.8.

*Primary Examiner* — Hunter B Lonsberry
*Assistant Examiner* — Jalal C Coduroglu
(74) *Attorney, Agent, or Firm* — SNELL & WILMER L.L.P.

(57) ABSTRACT

A method for detecting a fault within a brake mechanism on an aircraft is disclosed. In various embodiments, the method includes activating, by a brake control unit, the brake mechanism; receiving, by the brake control unit, a wheel speed data for a wheel associated with the brake mechanism; determining, by the brake control unit, a wheel speed characteristic for the wheel associated with the brake mechanism; and detecting, by the brake control unit, whether the brake mechanism is faulty based on a comparison of the wheel speed characteristic and a wheel speed deceleration database.

15 Claims, 5 Drawing Sheets

(56) References Cited

U.S. PATENT DOCUMENTS

| | | | | |
|---|---|---|---|---|
| 9,162,573 | B2* | 10/2015 | Grajkowski | F02D 11/105 |
| 10,005,566 | B2 | 6/2018 | Cahill | |
| 10,081,346 | B2* | 9/2018 | Romana | B60T 8/172 |
| 10,093,298 | B2* | 10/2018 | Kipp | B64C 25/44 |
| 10,220,843 | B2* | 3/2019 | Coulter | A61G 5/04 |
| 11,358,710 | B2* | 6/2022 | Plude | B64C 25/44 |
| 11,505,173 | B2* | 11/2022 | Georgin | B60T 8/1703 |
| 2009/0276133 | A1* | 11/2009 | May | B64C 25/46 |
| | | | | 188/1.11 E |
| 2010/0078519 | A1 | 4/2010 | Cahill | |
| 2015/0081142 | A1* | 3/2015 | Henderson | G05D 1/0083 |
| | | | | 701/16 |
| 2017/0355473 | A1* | 12/2017 | Cahill | B64C 25/34 |
| 2019/0263506 | A1* | 8/2019 | Hubbard | B64C 25/46 |
| 2020/0172066 | A1* | 6/2020 | Burte | B60T 8/1703 |
| 2020/0294401 | A1* | 9/2020 | Kerecsen | G08G 1/205 |
| 2020/0317327 | A1* | 10/2020 | Arsenault | B64C 25/44 |
| 2021/0284120 | A1* | 9/2021 | Georgin | B60T 17/221 |

* cited by examiner

DETECTION OF BRAKE FAILURE USING WHEEL SPEED DURING LANDING GEAR RETRACTION

CROSS-REFERENCE TO RELATED APPLICATIONS

This application claims priority to, and the benefit of, Provisional Patent Application No. 63/022,788, filed May 11, 2020 and titled "DETECTION OF BRAKE FAILURE USING WHEEL SPEED DURING LANDING GEAR RETRACTION," which application is incorporated herein by reference in its entirety for all purposes.

FIELD

The present disclosure relates to aircraft wheel and brake systems and, more particularly, to systems and methods for monitoring brake failure by detecting abnormal wheels speed during gear retraction.

BACKGROUND

Aircraft typically utilize brake systems on wheels to slow or stop the aircraft during landings, taxiing and emergency situations, such as, for example, a rejected takeoff (RTO), which generally refers to engagement of a brake system during an aborted takeoff and involves high braking loads over a short time period, resulting in a rapid increase in the brake temperature. The brake systems generally employ a heat sink comprising a series of friction disks, sandwiched between a pressure plate and an end plate, that may be forced into sliding contact with one another during a brake application to slow or stop the aircraft. Under various conditions, such brake applications may generate high temperatures and frictional loads throughout the heat sink and particularly on the surfaces of the stators and rotors and the pressure plate and the end plate that comprise the heat sink.

After take-off, landing gear, including the wheels and brake systems, may be stowed by retracting the landing gear into a wheel well of an airframe. During retraction, the wheels may or may not be rotating. Typically, the braking systems may be activated to apply a braking pressure to the wheels in order to slow or stop rotation of the wheels before, during or after retraction into the aircraft body. Once the brake systems are activated, rotation of the wheels, monitored by wheel speed transducers, should go to zero for all wheels in a short period of time. If a brake system has failed, however, the wheel speed for the wheel corresponding to the failed brake system may not go to zero, indicating that a failure of the brake system has occurred. In this manner, analyzing the rotational speed of the wheels following takeoff and during retraction of the landing gear may provide a means of detecting failure of a brake system.

SUMMARY

A method for detecting a fault within a brake mechanism on an aircraft is disclosed. In various embodiments, the method includes activating, by a brake control unit, the brake mechanism; receiving, by the brake control unit, a wheel speed data for a wheel associated with the brake mechanism; determining, by the brake control unit, a wheel speed characteristic for the wheel associated with the brake mechanism; and detecting, by the brake control unit, whether the brake mechanism is faulty based on a comparison of the wheel speed characteristic and a wheel speed deceleration database.

In various embodiments, the wheel speed deceleration database defines a first boundary that indicates a non-faulty brake mechanism based on the wheel speed characteristic. In various embodiments, the wheel speed deceleration database defines a second boundary that indicates a faulty brake mechanism based on the wheel speed characteristic.

In various embodiments, the method further includes monitoring, by the brake control unit, the wheel speed characteristic as a function of time. In various embodiments, the method further includes determining at a specified time, by the brake control unit, whether the wheel speed characteristic indicates the non-faulty brake mechanism by comparing the wheel speed characteristic against the first boundary. In various embodiments, the method further includes determining at the specified time, by the brake control unit, whether the wheel speed characteristic indicates the faulty brake mechanism by comparing the wheel speed characteristic against the second boundary.

In various embodiments, the method further includes receiving, by the brake control unit, a weight-on-wheels signal from a weight-on-wheels sensor. In various embodiments, the brake mechanism is activated after the weight-on-wheels signal indicates the aircraft is airborne. In various embodiments, the brake mechanism is activated at a specified load that is less than a full braking load.

In various embodiments, the brake control unit, at a specified time, determines whether the wheel speed characteristic indicates a non-faulty brake mechanism by comparing the wheel speed characteristic against the wheel speed deceleration database. In various embodiments, the brake control unit, at the specified time, determines whether the wheel speed characteristic indicates a faulty brake mechanism by comparing the wheel speed characteristic against the wheel speed deceleration database. In various embodiments, the wheel speed deceleration database defines a first boundary that indicates the non-faulty brake mechanism based on the wheel speed characteristic and a second boundary that indicates the faulty brake mechanism based on the wheel speed characteristic.

A system for detecting a fault within a brake mechanism on an aircraft is disclosed. In various embodiments, the system includes a wheel operably connected to the brake mechanism; a wheel speed sensor configured to monitor a wheel speed characteristic of the wheel, following activation of the brake mechanism at a specified load; a brake control unit configured to determine whether the brake mechanism is faulty based on a comparison of the wheel speed characteristic and a wheel speed deceleration database.

In various embodiments, the wheel speed deceleration database defines a first boundary that indicates a non-faulty brake mechanism based on the wheel speed characteristic. In various embodiments, the wheel speed deceleration database defines a second boundary that indicates a faulty brake mechanism based on the wheel speed characteristic.

In various embodiments, the brake control unit is configured to monitor the wheel speed characteristic as a function of time. In various embodiments, the brake control unit is configured to determine, at a specified time, whether the wheel speed characteristic indicates the non-faulty brake mechanism by comparing the wheel speed characteristic against the first boundary. In various embodiments, the brake control unit is configured to determine, at the specified time, whether the wheel speed characteristic indicates the faulty brake mechanism by comparing the wheel speed characteristic against the second boundary.

In various embodiments, the system further includes a weight-on-wheels sensor configured to provide a weight-on-wheels signal that indicates the aircraft is airborne. In various embodiments, the brake control unit is configured to activate the brake mechanism at the specified load, following receipt of the weight-on-wheels signal that indicates the aircraft is airborne.

The foregoing features and elements may be combined in various combinations, without exclusivity, unless expressly indicated herein otherwise. These features and elements as well as the operation of the disclosed embodiments will become more apparent in light of the following description and the accompanying drawings.

BRIEF DESCRIPTION OF THE DRAWINGS

The accompanying drawings illustrate various embodiments employing the principles described herein and are a part of the specification. The illustrated embodiments are meant for description and not to limit the scope of the claims.

DETAILED DESCRIPTION

The detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of elucidation and not of limitation. Furthermore, any reference to the singular includes plural embodiments, and any reference to more than one component or step may include a singular embodiment or step. Likewise, references to "a," "an" or "the" may include one item or more than one item and such reference to an item in the singular may also include the item in the plural. Also, any reference to attached, fixed, connected, or the like may include permanent, removable, temporary, partial, full or any other possible attachment option. Additionally, any reference to without contact (or similar phrases) may also include reduced contact or minimal contact. As used herein, "distal" refers to a direction outward, or generally away, from a reference component and "proximal" or "proximate" refer to a direction inward, or generally, towards the reference component. All ranges may include upper and lower values and all ranges and ratio limits disclosed herein may be combined. Further, the term "about" is intended to include a degree of error associated with measurement of a particular quantity based upon equipment or techniques otherwise available at the time of filing the application. For example, "about" may include a range of ±5% or 2% of a given value.

Figure 1A:
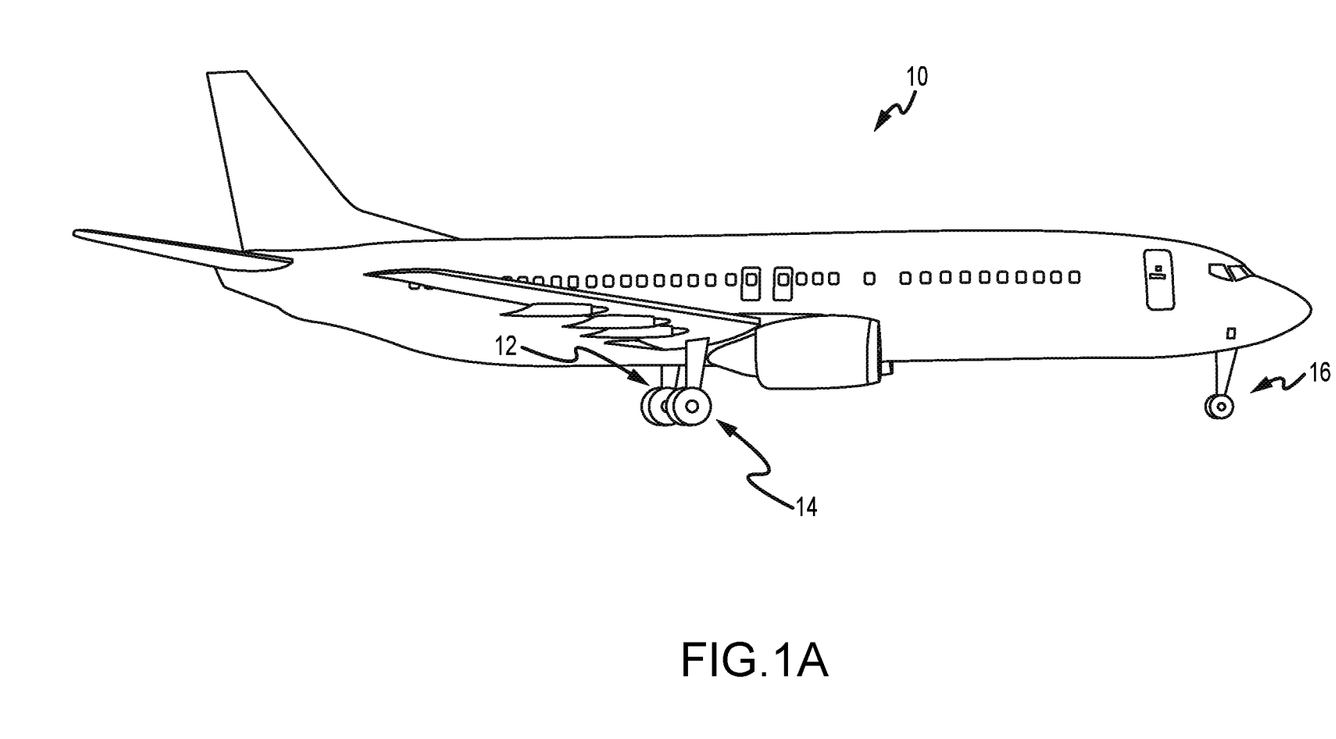
FIG. 1A illustrates an exemplary aircraft having a brake system, in accordance with various embodiments.
Figure 1B:
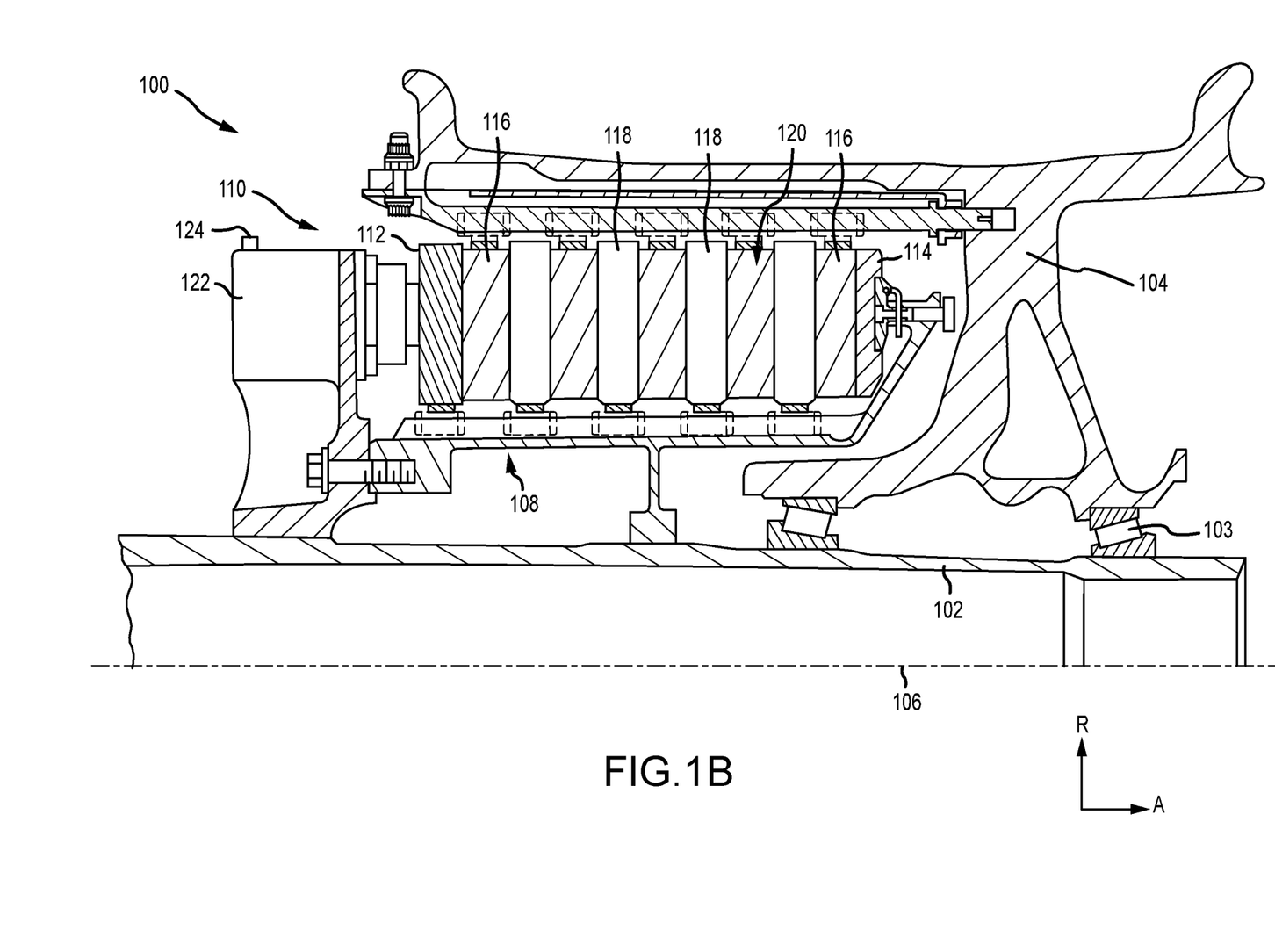
FIG. 1B illustrates a cross-sectional view of a brake mechanism, in accordance with various embodiments.

Referring now to FIG. 1A, in accordance with various embodiments, an aircraft 10 is illustrated. The aircraft 10 includes landing gear, which may include a left main landing gear 12, a right main landing gear 14 and a nose landing gear 16. The landing gear support the aircraft 10 when it is not flying, allowing the aircraft 10 to taxi, take off and land without damage. While the disclosure refers to the three landing gear configurations just described, the disclosure nevertheless contemplates any number of landing gear configurations. Referring now to FIG. 1B, there is schematically depicted a brake mechanism 100 configured for use on a landing gear, such as, for example, each of the left main landing gear 12 and the right main landing gear 14 described above with reference to FIG. 1A. In various embodiments, the brake mechanism is mounted on an axle 102 for use with a wheel 104 disposed on and configured to rotate about the axle 102 via one or more bearing assemblies 103. A central axis 106 extends through the axle 102 and defines a center of rotation of the wheel 104. A torque plate barrel 108 (sometimes referred to as a torque tube or barrel or a torque plate) is aligned concentrically with the central axis 106, and the wheel 104 is rotatable relative to the torque plate barrel 108.

The brake mechanism 100 includes an actuator ram assembly 110, a pressure plate 112 disposed adjacent the actuator ram assembly 110, an end plate 114 positioned a distal location from the actuator ram assembly 110, and a plurality of rotor disks 116 interleaved with a plurality of stator disks 118 positioned intermediate the pressure plate 112 and the end plate 114. The pressure plate 112, the plurality of rotor disks 116, the plurality of stator disks 118 and the end plate 114 together form a brake heat sink or brake stack 120. The pressure plate 112, the end plate 114 and the plurality of stator disks 118 are mounted to the torque plate barrel 108 and remain rotationally stationary relative to the axle 102. The plurality of rotor disks 116 is mounted to the wheel 104 and rotate with respect to each of the pressure plate 112, the end plate 114 and the plurality of stator disks 118.

An actuating mechanism for the brake mechanism 100 includes a plurality of actuator ram assemblies, including the actuator ram assembly 110, circumferentially spaced around a piston housing 122 (only one actuator ram assembly is illustrated in FIG. 1B). Upon actuation, the plurality of actuator ram assemblies affects a braking action by urging the pressure plate 112 and the plurality of stator disks 118 into frictional engagement with the plurality of rotor disks 116 and against the end plate 114. Through compression of the plurality of rotor disks 116 and the plurality of stator disks 118 between the pressure plate 112 and the end plate 114, the resulting frictional contact slows or stops or otherwise prevents rotation of the wheel 104. In various embodiments, the plurality of rotor disks 116 and the plurality of stator disks 118 are fabricated from various materials, such as, for example, ceramic matrix composite materials, that enable the brake disks to withstand and dissipate the heat generated during and following a braking action.

In various embodiments, the actuator ram assemblies may comprise electrically operated actuator rams or hydraulically operated actuator rams, although some brakes may use pneumatically operated actuator rams. In brake systems that employ fluid powered (e.g., hydraulic or pneumatic powered) actuator rams, the actuator ram assemblies may be coupled to a power source via a brake servo valve (BSV) and a shutoff valve (SOV). The SOV effectively functions as a shutoff valve, wherein in a first position (e.g., an armed position), fluid pressure is permitted to pass through the valve, while in a second position (e.g., a disarmed position) fluid pressure is restricted or prevented from passing through the valve. During normal braking, the SOV is in the armed position, thereby permitting the flow of fluid pressure. The BSV, based on braking commands from the pilot (often via an electronic controller that may implement, for example, anti-skid logic) controls the amount of fluid pressure provided to the actuator ram and, thus, the braking force applied to the wheel. To prevent or minimize unintentional braking (e.g, due to a faulty servo valve) at various times, the SOV is set in the disarmed position, thereby removing or decreasing fluid pressure from the BSV. Since the BSV does not receive sufficient fluid pressure, it cannot provide fluid pressure to the actuator ram and, thus, braking cannot be affected.

In electronic brake systems, a brake controller (or controller) is coupled to one or more electromechanical actuator controllers (EMAC) for a brake, which drives one or more electromechanical brake actuators. The brake controller may be in communication with a brake pedal, and thus may control the EMAC in accordance with pilot or copilot braking commands. In various aircraft, other means are used to compress a brake disk stack A brake controller may comprise a processor and a tangible, non-transitory memory. The brake controller may comprise one or more logic modules that implement brake logic. In various embodiments, the brake controller may comprise other electrical devices to implement brake logic.

Figure 2:
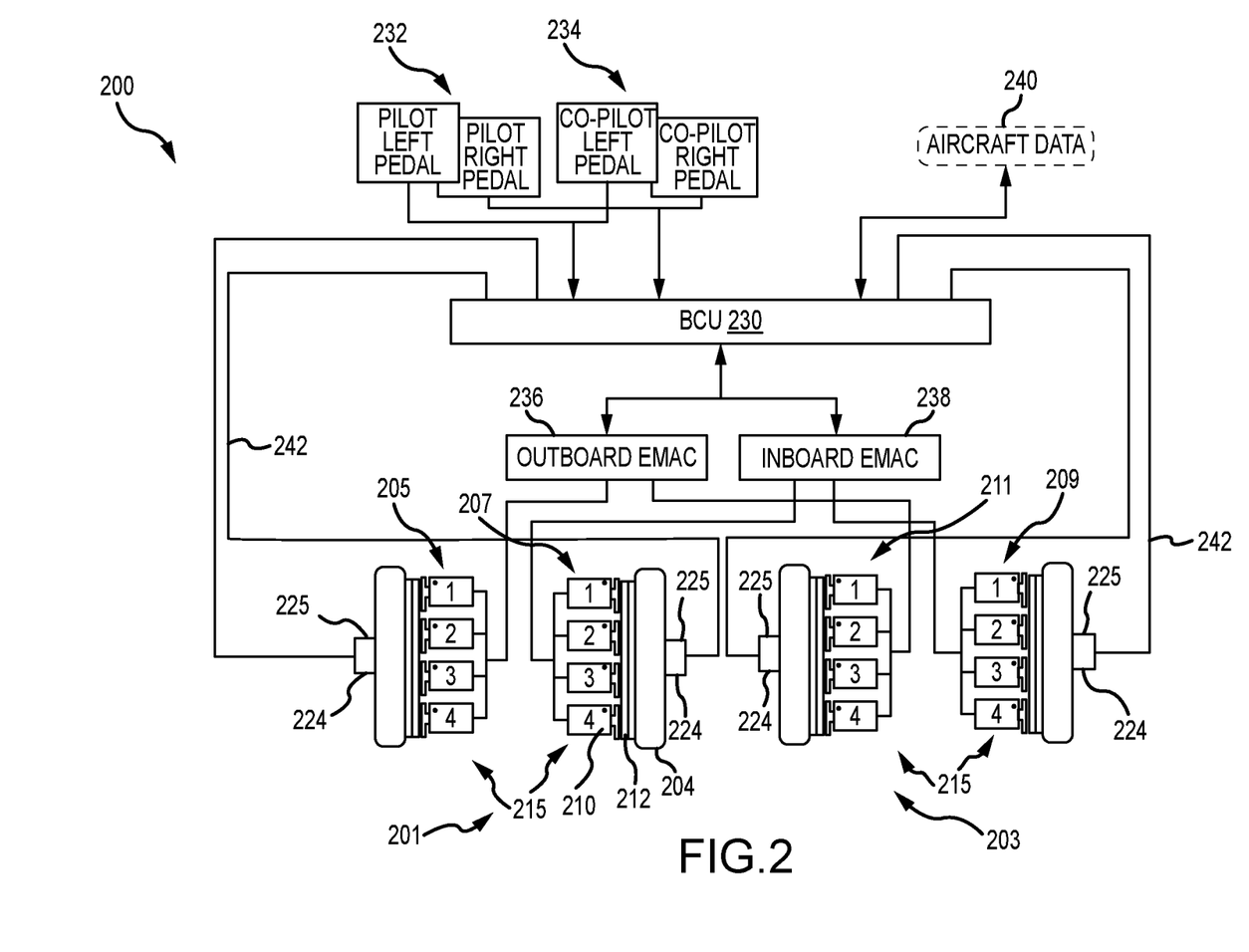
FIG. 2 illustrates a schematic view of a brake system, in accordance with various embodiments.

Referring now to FIG. 2, a schematic view of a brake system 200 is provided, in accordance with various embodiments. The brake system 200 includes a plurality of landing gear, such as, for example, a left main landing gear 201 and a right main landing gear 203. The left main landing gear 201 includes a left outboard brake mechanism 205 and a left inboard brake mechanism 207. Similarly, the right main landing gear 203 includes a right outboard brake mechanism 209 and a right inboard brake mechanism 211. One or more wheels 204 may be included with each of the left main landing gear 201 and the right main landing gear 203. While left and right orientations for the landing gear and brake mechanisms are described above, the same components may be referred to as a first landing gear and a second landing gear, each having a first brake mechanism and a second brake mechanism, without loss of generality. In various embodiments, each of the left outboard brake mechanism 205, the left inboard brake mechanism 207, the right outboard brake mechanism 209 and the right inboard brake mechanism 211 includes a plurality of actuators 215 (labeled #1, #2, #3 and #4), each of which includes an actuator ram assembly 210 configured to apply a load against a pressure plate 212, similar to, for example, the actuator ram assembly 110 and the pressure plate 112 described above with reference to FIG. 1B. Further, each of the left outboard brake mechanism 205, the left inboard brake mechanism 207, the right outboard brake mechanism 209 and the right inboard brake mechanism 211 may include a wheel speed sensor 224, similar to the temperature sensor 124 described above with reference to FIG. 1B.

In various embodiments, the brake system 200 is controlled by a brake control unit 230. The brake control unit (BCU) 230 is configured to receive various operator inputs, such as, for example, left and right pilot brake pedal signals from left and right pilot brake pedals 232 and left and right co-pilot brake pedal signals from left and right co-pilot brake pedals 234. In various embodiments, the BCU 230 is operatively coupled to one or more electro-mechanical actuator controllers (EMACs), including, for example, an outboard EMAC 236 and an inboard EMAC 238. In various embodiments, the outboard EMAC 236 is configured to receive brake force signals from the BCU 230 and control operation of the left outboard brake mechanism 205 and the right outboard brake mechanism 209, while the inboard EMAC 238 is configured to receive brake force signals from the BCU 230 and control operation of the left inboard brake mechanism 207 and the right inboard brake mechanism 211.

In various embodiments, the BCU 230 may receive other aircraft data 240, such as, for example, sensor data reflecting the rotational speed of the one or more wheels 204 or weight data from a weight-on-wheels sensor 225 (or a WOW sensor), configured to detect whether the aircraft is on the ground or in flight. For example, in various embodiments, the wheel speed sensor 224 associated with each brake mechanism is electrically coupled to the BCU 230 via one or more data buses 242. In such fashion, the BCU 230 may be configured to monitor wheel speed data received from the left main landing gear 201 and the right main landing gear 203. As described below, the wheel speed data received from the various landing gear may be analyzed and used to determine whether a fault or failure has occurred with a particular brake mechanism. Note that while FIG. 2 is representative of an electromechanical operated brake system, the principles described herein apply equally to hydraulic or pneumatic operated brake systems.

Figure 3:
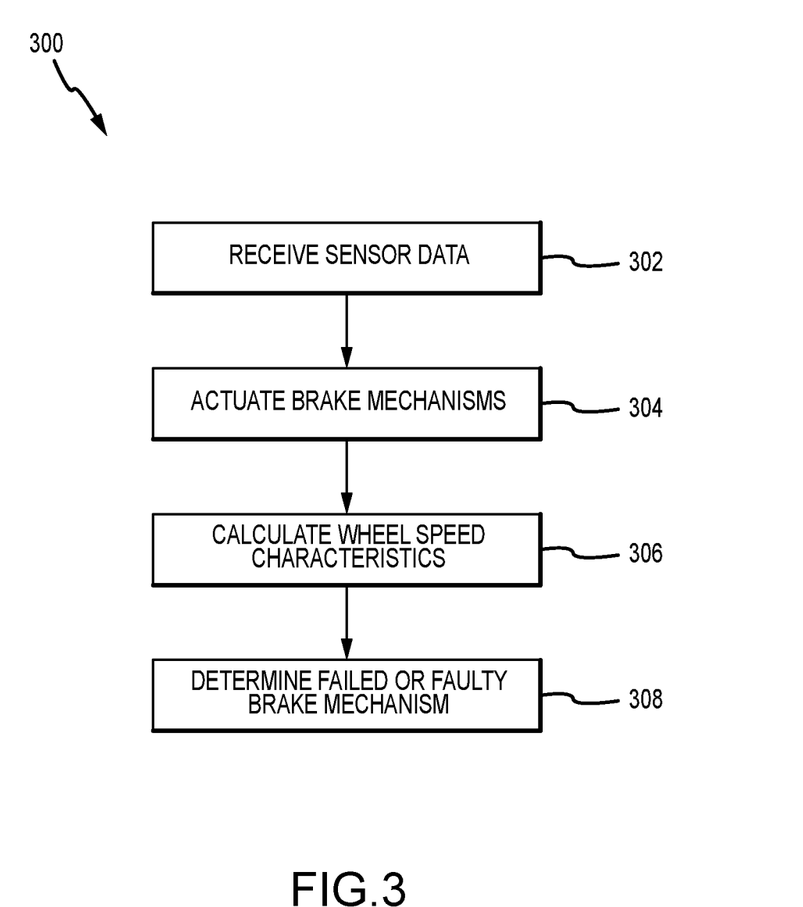
FIG. 3 illustrates a method for detecting a brake failure via wheel speed, in accordance with various embodiments.

With reference to FIG. 3, and with continued reference to FIG. 2, a method 300 for determining or detecting a failed or faulty brake is illustrated, in accordance with various embodiments. The brake control unit 230, described above with reference to FIG. 2, may be capable of carrying out the steps of FIG. 3. Generally, the method 300 may be initiated after a weight-on-wheels sensor (e.g., the weight-on-wheels sensor 225) of the landing gear indicates (e.g., via a weight-on-wheels signal) that weight is off wheels—i.e., a weight-off-wheels (or WOFFW) query is true. The method 300 may be performed by the brake control unit 230 and may include the steps of receiving sensor data (a first step 302), actuating the brake mechanisms associated with each wheel (a second step 304), calculating a wheel speed characteristic for each wheel (a third step 306) and determining a failed or faulty brake mechanism based on the wheel speed characteristics (a fourth step 308).

The first step 302 may comprise receiving an input of sensor data from one or more sensors, such as the weight-on-wheels sensor 225 and the wheel speed sensor 224 associated with each brake mechanism. In various embodiments, the wheel speed sensor 224 may detect or record a series of measurements about the wheels, where the measurements may correlate to wheel speed. In various embodiments, for example, the wheel speed sensor 224 may detect the speed, acceleration, displacement or position of the wheel associated with a particular brake mechanism following activation of the brake mechanism to slow and eventually stop the wheel from spinning. In various embodiments, the wheel speed sensor 224 may include a wheel speed transducer to measure wheel speed directly as an angular or a rotational velocity, such as rotations per minute (RPM) or radians per second (rad/s). Data from the wheel speed sensor 224 may be further processed by the brake control unit 230 to calculate the wheel speed characteristic to be used to detect a failed or faulty brake mechanism.

A second step 304 may comprise actuating the brake mechanisms associated with each wheel. In various embodiments, actuating the brake mechanisms includes applying a specified load, typically at a rate or compressive load within the brake stack that is much less than that normally applied or full braking load during a brake event following a landing or a rejected takeoff. This is because only the angular momentum or rotational kinetic energy of the spinning wheels needs to be countered, rather than the kinetic energy of the entire aircraft. In various embodiments, the brake load is applied at a specified time following takeoff and the wheels speed characteristic (e.g., the wheel speed) is measured and provides an input or initial condition to the brake control unit for processing. Following actuation of the brake mechanisms, the sensor data for wheel speed is continued to be received by the brake control unit 230 for processing and for carrying out the third step 306.

The third step 306 may comprise calculating a wheel speed characteristic of each wheel by determining a wheel speed, e.g., angular velocity, of each wheel 204 based on sensor measurements and by further processing the wheel speed, for example, by summation, integration, or the like, into the wheel speed characteristic. In various embodiments, the wheel speed sensor 224 associated with each wheel or brake mechanism may measure the angular displacement of the wheel 204. A measurement of the angular displacement over time allows the brake control unit to calculate the wheel speed. The acceleration (or deceleration) of a wheel may also be derived based on the angular velocity or the wheel speed over time. The third step 306 may comprise a step of filtering or conditioning the data from the wheel speed sensors. Conditioning of the data may be realized by summation, integration or other filtering methods. The third step 306 may also comprise calculating a sum of the wheel speed measurements or conditioned wheel speed measurements over a time interval to obtain a value for each wheel, wherein the value represents the wheel speed characteristic, which may be expressed as a magnitude of the total wheel displacement during the time interval. In various embodiments, the wheel speed characteristic may comprise, for example, a filtered measurement of angular velocity, such as an integral or sum of angular velocity over a time interval. In various embodiments, the time interval may begin after takeoff and may end prior to or during a gear retract braking. The time interval may end at the time when the last wheel of the landing gear stops spinning or reaches a wheel speed of zero ($\omega=0$).

The fourth step 308 may comprise determining the existence of a failed or faulty brake mechanism by evaluating the wheel speed characteristic for each wheel. In various embodiments, the existence of a failed or faulty brake mechanism may be determined by comparing the time for a wheel to stop spinning against corresponding values of time and wheel speed stored in a database (e.g., a wheel speed deceleration database). The database includes experimental or theoretical data concerning the time required for a wheel to stop spinning given various initial conditions, such as, for example, the wheel speed at the time the brake mechanisms are actuated.

Figure 4:
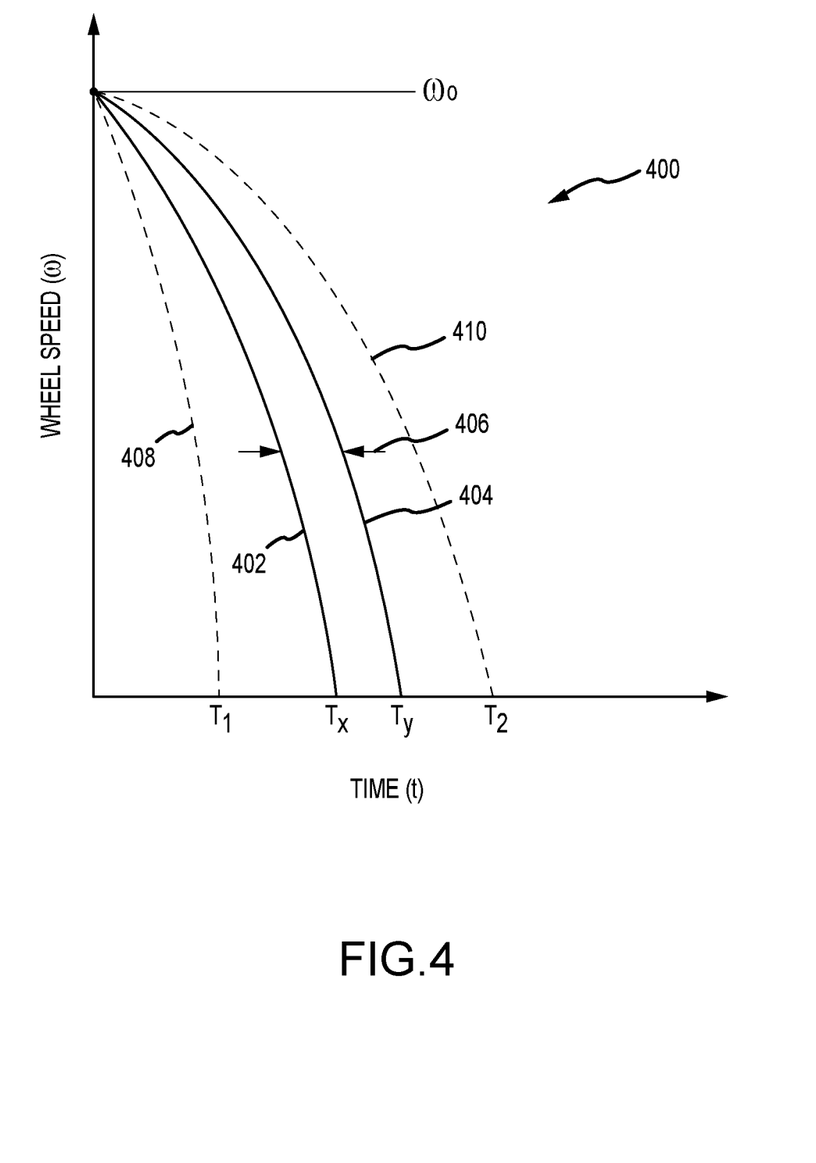
FIG. 4 provides a graphical representation of a method for detecting a brake failure via wheel speed, in accordance with various embodiments.

Referring to FIG. 4, for example, a graphical representation 400 of a wheel speed deceleration database is illustrated, where brake quality is provided as a functional relationship between wheel speed and elapsed time for a given applied brake force and for a particular brake mechanism and wheel (i.e., the functional relationship will be unique to a particular brake mechanism and wheel and tire combination). Say, for example, following takeoff, the wheels are spinning at an initial wheel speed, $\omega_0$. Following application of the brake force described above at the second step 304, the wheel speed characteristic will begin to reduce or decelerate (i.e., the rotational velocity of the wheel will slow and eventually stop). As illustrated in FIG. 4, if the wheel speed reaches $\omega=0$ within the time period $0 \leq t \leq Tx$, then the brake mechanism may be considered in good operational condition. A first boundary 402 may be defined indicating the brake mechanism is a non-faulty brake mechanism if the wheel speed decelerates to zero velocity within a time period to the left of the first boundary 402 (or at a time $t \leq Tx$). If, on the other hand, the wheel speed reaches $\omega=0$ within the time period $t \geq Tx$, then the brake mechanism may be considered in a failed or faulty operational condition. A second boundary 404 may be defined indicating the brake mechanism is a faulty brake mechanism if the wheel speed decelerates to zero velocity within a time period to the right of the second boundary 404 (or at a time $t \leq Ty$). In various embodiments, the second boundary 404 is established by adding a tolerance 406 to the first boundary 402 or, in various embodiments, the second boundary 404 may collapse upon or be identical to the first boundary 402, providing no tolerance between what is considered a good or non-faulty brake mechanism and a bad or a faulty brake mechanism. For example, a first wheel speed profile 408 starts at the initial condition wo and reaches $\omega=0$ at time $t=T_1$. The time $T_1$ is less than Tx, so the brake control unit will determine the brake mechanism is non-faulty. Conversely, a second wheel speed profile 410 starts at the initial condition wo and reaches $\omega=0$ at time $t=T_2$. The time $T_2$ is greater than Ty, so the brake control unit will determine the brake mechanism is faulty. Note with reference to FIG. 4 that the wheel speed does not have to decelerate to zero speed before the brake control unit determines whether a brake mechanism is faulty or not. Rather, in various embodiments, all the brake control unit is required to determine is whether, at a specified time, a wheel speed profile is to the left of the first boundary 402 or to the right of the second boundary 404. This enables the determination to be made faster than decelerating the wheel all the way to zero and allows the gear retraction operation to proceed more expeditiously.

The foregoing systems and methods provide a means for early detection of brake failure, obviating the usual practice of waiting until a scheduled maintenance cycle to analyze the operational status of a brake mechanism. The systems and methods provide a simple way to detect the existence of a brake failure following each takeoff during the landing gear retraction operation. In the event a brake failure is detected following takeoff, a pilot may manually, or the brake control unit may automatically, alert maintenance officials for repair or replacement, prior to the next scheduled maintenance cycle, thereby increasing safety and operational expense.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

In various embodiments, system program instructions or controller instructions may be loaded onto a tangible, non-transitory, computer-readable medium (also referred to herein as a tangible, non-transitory, memory) having instructions stored thereon that, in response to execution by a controller, cause the controller to perform various operations. The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media that were found by In Re Nuijten to fall outside the scope of patentable subject matter under 35 U.S.C. § 101.

Furthermore, no element, component, or method step in the present disclosure is intended to be dedicated to the public regardless of whether the element, component, or method step is explicitly recited in the claims. No claim element herein is to be construed under the provisions of 35 U.S.C. 112 (f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, it should be understood that any of the above described concepts can be used alone or in combination with any or all of the other above described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed is:

1. A method for detecting a fault within a brake mechanism on an aircraft, comprising:
    activating, by a brake control unit, the brake mechanism;
    receiving, by the brake control unit, a wheel speed data for a wheel associated with the brake mechanism;
    determining, by the brake control unit, a wheel speed characteristic for the wheel associated with the brake mechanism; and
    detecting, by the brake control unit, whether the brake mechanism is faulty based on a comparison of the wheel speed characteristic and a wheel speed deceleration database, wherein the wheel speed deceleration database defines a first boundary that indicates a non-faulty brake mechanism based on the wheel speed characteristic, and wherein the wheel speed deceleration database defines a second boundary that indicates a faulty brake mechanism based on the wheel speed characteristic.

2. The method of claim 1, further comprising monitoring, by the brake control unit, the wheel speed characteristic as a function of time.

3. The method of claim 2, further comprising determining at a specified time, by the brake control unit, whether the wheel speed characteristic indicates the non-faulty brake mechanism by comparing the wheel speed characteristic against the first boundary.

4. The method of claim 3, further comprising determining at the specified time, by the brake control unit, whether the wheel speed characteristic indicates the faulty brake mechanism by comparing the wheel speed characteristic against the second boundary.

5. The method of claim 1, further comprising receiving, by the brake control unit, a weight-on-wheels signal from a weight-on-wheels sensor.

6. The method of claim 5, wherein the brake mechanism is activated after the weight-on-wheels signal indicates the aircraft is airborne.

7. The method of claim 6, wherein the brake mechanism is activated at a specified load that is less than a full braking load.

8. The method of claim 7, wherein the brake control unit, at a specified time, determines whether the wheel speed characteristic indicates the non-faulty brake mechanism based at least in part on the first boundary.

9. The method of claim 8, wherein the brake control unit, at the specified time, determines whether the wheel speed characteristic indicates the faulty brake mechanism by based at least in part on the second boundary.

10. A system for detecting a fault within a brake mechanism on an aircraft, comprising:
    a wheel operably connected to the brake mechanism;
    a wheel speed sensor configured to monitor a wheel speed characteristic of the wheel, following activation of the brake mechanism at a specified load; and
    a brake control unit configured to determine whether the brake mechanism is faulty based on a comparison of the wheel speed characteristic and a wheel speed deceleration database, wherein the wheel speed deceleration database defines a first boundary that indicates a non-faulty brake mechanism based on the wheel speed characteristic, and wherein the wheel speed deceleration database defines a second boundary that indicates a faulty brake mechanism based on the wheel speed characteristic.

11. The system of claim 10, wherein the brake control unit is configured to monitor the wheel speed characteristic as a function of time.

12. The system of claim 11, wherein the brake control unit is configured to determine, at a specified time, whether the wheel speed characteristic indicates the non-faulty brake mechanism by comparing the wheel speed characteristic against the first boundary.

13. The system of claim 12, wherein the brake control unit is configured to determine, at the specified time, whether the wheel speed characteristic indicates the faulty brake mechanism by comparing the wheel speed characteristic against the second boundary.

14. The system of claim 13, further comprising a weight-on-wheels sensor configured to provide a weight-on-wheels signal that indicates the aircraft is airborne.

15. The system of claim 14, wherein the brake control unit is configured to activate the brake mechanism at the specified load, following receipt of the weight-on-wheels signal that indicates the aircraft is airborne.

* * * * *